(12) United States Patent
Kara et al.

(10) Patent No.: US 8,064,088 B2
(45) Date of Patent: Nov. 22, 2011

(54) POSTAGE SERVER SYSTEM AND METHOD

(75) Inventors: Salim G. Kara, Ontario (CA); Martin J. Pagel, Kirkland, WA (US)

(73) Assignee: Stamps.com Inc, Los Angeles, CA (US)

( * ) Notice: Subject to any disclaimer, the term of this patent is extended or adjusted under 35 U.S.C. 154(b) by 0 days.

(21) Appl. No.: 12/953,295

(22) Filed: Nov. 23, 2010

(65) Prior Publication Data
US 2011/0066574 A1    Mar. 17, 2011

Related U.S. Application Data (63) Continuation of application No. 11/827,467, filed on Jul. 12, 2007, now Pat. No. 7,678,791, which is a continuation of application No. 08/953,477, filed on Oct. 17, 1997, now Pat. No. 7,265,853.

(51) Int. Cl.
*G06F 3/12* (2006.01)
*G06K 15/00* (2006.01)
(52) U.S. Cl. ........................ 358/1.15; 358/402
(58) Field of Classification Search .................. 358/1.1, 358/1.13, 1.15, 407, 425, 442, 402, 403; 709/206, 238, 239, 244; 379/100.01, 100.08, 379/100.09, 100.15
See application file for complete search history.

(56) References Cited

U.S. PATENT DOCUMENTS

| | | | |
|---|---|---|---|
| 4,458,109 A | 7/1984 | Mueller-Schloer |
| 4,799,156 A | 1/1989 | Shavit et al. |
| 4,802,218 A | 1/1989 | Wright et al. |
| 4,831,555 A | 5/1989 | Sansone et al. |
| 4,858,138 A | 8/1989 | Talmadge |
| 4,864,618 A | 9/1989 | Wright et al. |
| 4,900,903 A | 2/1990 | Wright et al. |
| 4,900,904 A | 2/1990 | Wright et al. |
| 4,908,770 A | 3/1990 | Breault et al. |
| 4,999,481 A | 3/1991 | Baer et al. |
| 4,999,806 A | 3/1991 | Chernow et al. |
| 5,058,008 A | 10/1991 | Schumacher |
| 5,111,030 A | 5/1992 | Brasington et al. |
| 5,136,647 A | 8/1992 | Haber et al. |
| 5,150,407 A | 9/1992 | Chan |
| 5,377,268 A | 12/1994 | Hunter |
| 5,381,527 A | 1/1995 | Inness et al. |

(Continued)

FOREIGN PATENT DOCUMENTS
DE    4403626    8/1995
(Continued)

OTHER PUBLICATIONS
Internet—Hyvrid mail—Norway Post: Service, report 1996.
(Continued)

*Primary Examiner* — Gabriel Garcia
(74) *Attorney, Agent, or Firm* — Fulbright & Jaworski L.L.P.

(57) ABSTRACT

A system and method for transmission of a document from a sending location to a receiving location by way of a trusted way location is disclosed. A selected document is physically or electronically transmitted by a sending location to a letter server operated by a delivery service. A confirmation of transmission of the document is provided the sender by the delivery service. Thereafter, the letter server reproduces the document in original quality, accompanied by any necessary items such as a delivery container and/or delivery instructions. The delivery service then delivers the reproduced document such as through electronic delivery or inducting the reproduced document into its delivery paradigm for physical delivery to the indicated recipient.

28 Claims, 3 Drawing Sheets

U.S. PATENT DOCUMENTS

| | | | |
|---|---|---|---|
| 5,404,231 A | 4/1995 | Bloomfield | |
| 5,432,618 A | 7/1995 | Monnot et al. | |
| 5,454,038 A | 9/1995 | Cordery et al. | |
| 5,499,109 A | 3/1996 | Mathur et al. | |
| 5,508,817 A * | 4/1996 | Kunigami | 358/402 |
| 5,513,126 A | 4/1996 | Harkins et al. | |
| 5,553,145 A | 9/1996 | Micali | |
| 5,608,786 A | 3/1997 | Gordon et al. | |
| 5,613,012 A | 3/1997 | Hoffman et al. | |
| 5,629,982 A | 5/1997 | Micali | |
| 5,648,916 A | 7/1997 | Manduley | |
| 5,666,420 A | 9/1997 | Micali | |
| 5,689,550 A | 11/1997 | Garson et al. | |
| 5,729,461 A | 3/1998 | D'Andrea et al. | |
| 5,754,306 A | 5/1998 | Taylor et al. | |
| 5,758,327 A | 5/1998 | Gardner et al. | |
| 5,771,289 A | 6/1998 | Kuzma | |
| 5,774,886 A | 6/1998 | Kara | |
| 5,778,076 A | 7/1998 | Kara et al. | |
| 5,781,634 A | 7/1998 | Cordery et al. | |
| 5,796,791 A | 8/1998 | Polcyn | |
| 5,796,834 A | 8/1998 | Whitney et al. | |
| 5,796,841 A | 8/1998 | Cordery et al. | |
| 5,801,364 A | 9/1998 | Kara et al. | |
| 5,801,944 A | 9/1998 | Kara | |
| 5,805,810 A | 9/1998 | Maxwell | |
| 5,812,990 A | 9/1998 | Ryan, Jr. et al. | |
| 5,812,991 A | 9/1998 | Kara | |
| 5,819,240 A | 10/1998 | Kara | |
| 5,822,739 A | 10/1998 | Kara | |
| 5,825,893 A | 10/1998 | Kara | |
| 5,826,034 A * | 10/1998 | Albal | 709/239 |
| 5,850,519 A | 12/1998 | Vazana et al. | |
| 5,859,967 A | 1/1999 | Kaufeld et al. | |
| 5,862,202 A | 1/1999 | Bashoura et al. | |
| 5,870,454 A | 2/1999 | Dahlen et al. | |
| 5,872,926 A | 2/1999 | Levac et al. | |
| 5,894,558 A | 4/1999 | Falker et al. | |
| 5,903,877 A | 5/1999 | Berkowitz et al. | |
| 5,984,174 A | 11/1999 | Kato et al. | |
| 5,999,967 A | 12/1999 | Sundsted | |
| 6,192,473 B1 | 2/2001 | Ryan, Jr. et al. | |
| 7,265,853 B1 * | 9/2007 | Kara et al. | 358/1.15 |
| 7,864,356 B2 * | 1/2011 | Kara et al. | 358/1.15 |

FOREIGN PATENT DOCUMENTS

| | | |
|---|---|---|
| EP | 0483421 | 5/1992 |
| WO | WO-98/14909 | 4/1998 |
| WO | WO-99/48054 | 9/1999 |

OTHER PUBLICATIONS

Patel et al., "The multimedia Fax—MIME Gateway," 1994 IEEE, pp. 64-70.

Internet—ePost in a nutshell—Finland Post Ltd.—publication date unknown—discovered Jan. 1998.

Written Opinion, mailed Jan. 12, 2000.

IBM Technical Disclosure Bulletin "Correlation Table Mechanism for an IBM-X-400 Gateway," by IBM Corp., pp. 123-125, Nov. 1991.

AT&T's Electronic Mail Service for Government Users "Mehmet Toy" by AT&T Bell Laboratories, pp. 950-957, Jun. 12, 1992.

* cited by examiner

POSTAGE SERVER SYSTEM AND METHOD

CROSS-REFERENCE TO RELATED APPLICATIONS

The present application is a continuation of commonly assigned U.S. patent application Ser. No. 11/829,467, entitled "POSTAGE SERVER SYSTEM AND METHOD," filed Jul. 27, 2007, which is a continuation of U.S. patent application Ser. No. 08/953,477, entitled "POSTAGE SERVER SYSTEM AND METHOD," filed Oct. 17, 1997, now issued as U.S. Pat. No. 7,265,853, and reference is hereby made to the following commonly assigned applications: U.S. patent application Ser. No. 08/812,803, entitled "SYSTEM AND METHOD FOR CONTROLLING THE DISPENSING OF AN AUTHENTICATING INDICIA" filed Jun. 18, 1997, now issued as U.S. Pat. No. 5,900,154; U.S. patent application Ser. No. 08/515,988, entitled, "SYSTEM AND METHOD FOR CONTROLLING THE STORAGE OF DATA WITHIN A PORTABLE MEMORY," filed Aug. 16, 1998, now issued as U.S. Pat. No. 5,801,364; U.S. patent application Ser. No. 08/561,417, entitled, "SYSTEM AND METHOD FOR PRINTING POSTAGE INDICIA DIRECTLY ON DOCUMENTS," filed Nov. 21, 1995, now issued as U.S. Pat. No. 5,801,994; and U.S. patent application Ser. No. 08/711,080, entitled "METHOD AND SYSTEM FOR ELECTRONIC DOCUMENT CERTIFICATION," filed Sep. 10, 1996, now issued as U.S. Pat. No. 5,982,506, the disclosures of which are incorporated herein by reference.

TECHNICAL FIELD

This invention relates to electronic document transfer systems and methods and more particularly to a system and method which provides for the electronic transmission of documents and their subsequent printing and delivery in physical form.

BACKGROUND OF THE INVENTION

During the past decade the sending of documents from one location to another in electronic (soft) form has become common place. Initially facsimile (FAX) began to replace hard delivery of documents and now electronic mail (e-mail) and other forms of electronic transfer are becoming popular. Such electronic document transmission has the advantage of transmitting large amounts of information across large physical expanses almost instantaneously.

However, such electronic transmissions are not without their short comings. For example, an obvious problem with point to point electronic transmission of documents is the necessity for compatible equipment having particular functionality at both the sending and receiving locations. Issues with respect to the ability to communicate between various configurations of communication equipment have become less pronounced in recent years, however there still remains the need for the sending and receiving locations to possess electronic document processing systems capable of meaningful data communication.

Additionally, there remains the need for the system from which the document is transferred to have the capability to accept the document to be transferred in whatever form it exists and to convert this to the electronic data stream ultimately transferred. Likewise, there is a need for the system to which the document is transferred to possess the capability to reproduce, either through electronic display or physical printing, the transferred document. Where graphical images, as opposed to textual messages, or large or otherwise complicated documents are transferred, the capability to reproduce such documents may easily exceed the capability of a typical present day communication system.

A more subtle problem with point to point transmission of electronic documents today is confirmation of a successful transfer between the sending site and the receiving site. Often current day transmission systems, such as e-mail through such systems as the Internet, report successful transmission of a document, but do not provide confirmation of receipt of the document. This can require an additional step by the sender such as communication via other means to independently confirm that the document was received by the intended system. Furthermore, often documents are transmitted to hostile or adverse parties in order to preserve legal rights etcetera. In such circumstances it is not uncommon for these parties to be less than forthright with information regarding the receipt of the document.

Ancillary to this problem is the fact that there is little or no physical proof of transmission of the document, if later circumstances require proof that the document was in fact transferred. For example, typically there is no independent third party to confirm that indeed a document was transferred. Likewise there is no physical proof of receipt of the document by the receiving party. Such lack of a "paper trail" with respect to the transmission of a document renders electronic transfer undesirable for some documents, such as legal documents or the like, where proof of transmission and/or receipt is necessary.

Furthermore, as electronic document transfer is relatively new to the typical office infrastructure, there are not always reliable procedures in place at the receiving location to insure its proper handling. For example, as physical delivery of documents as mail by a postal authority is very old, businesses and the like have instituted infrastructure in the form of policies and procedures to ensure its proper handling from receipt at the business to its ultimate delivery to the intended, or appropriate, individual. However, electronic transmission of documents often short circuit this infrastructure and avoid proper internal handling, such as docketing or otherwise associating the document with related information.

Moreover, once provided a simple public gateway from which to receive electronic documents from the public at large, such as the Internet, businesses are often overwhelmed with the increase in incoming documents. For example, because such electronic gateways are often very inexpensive or even free for the public to communicate documents directly to a recipient, i.e., the above described businesses, often recipients are the target of a number of unsolicited and even undesired communications. It is not unheard of for a particularly upset individual to automate a document transmission system in order to flood a recipient with communications which, at the least, require the separation of these documents from those of importance to the recipient. In worst case scenarios, such efforts have lead to the recipients electronic document system reaching capacity and thus being unavailable to receive desired and even necessary messages.

A need therefore exists in the art of document transfer for establishing a system and method for providing the speed of transmission of electronic documents with the advantages of independent third party receipt and/or delivery of documents.

Another need exists in the art for providing a robust receiving system capable of accepting electronic document transfer from a wide variety of transmission systems. Similarly, a need exists for this receiving system to provide for the physical reproduction of complex and lengthy transmitted documents such that most forms of text as well as precise graphical images may be reproduced on a variety of media sizes.

A further need exists in the art of document transfer for providing a means by which a designated recipient of an electronic document may selectively accept electronic documents, or otherwise discourage unwanted document transmissions, without undesirably affecting the recipient's electronic document acceptance system.

BRIEF SUMMARY OF THE INVENTION

These and other objects, needs and desires are obtained in a system and method of document transfer in which a document is transferred from a sending location to a sanctioned or trusted way location for reproduction (physical or otherwise) and subsequent delivery to an intended recipient. In a preferred embodiment, the way location is an office of a postal authority nearest the intended recipient. In this embodiment, upon reproduction of the transferred document, the postal authority may physically deliver the document commensurate with its standard delivery techniques.

Information within, or accompanying, the document may provide the delivery agents with specialized instructions regarding the delivery of the transmitted document. For example, registered delivery or a return receipt signed by a recipient may be requested. Moreover, the way location may provide automated acknowledgement of receipt of the transmitted document at the way location. Thus, even without acknowledgement of actual delivery by the intended recipient, the sender of a document may be provided trustworthy documentation of transmission of a document.

Likewise, information regarding preferred delivery methods of a particular recipient may be utilized by the delivery agents. For example, a preference to receive all documents possible by e-mail may be stored in a database by the delivery agent.

It shall be appreciated that traditional transmission of documents through such systems as a postal authority require the posting of the document by the sender. Posting typically involves placing the mail item is some sort of receptacle, i.e., a mail box, to await its induction into the system during a scheduled collection by a postal agent. Thereafter, the mail item must be handled, sorted, and physically transported a number of times in order to reach a postal office near the intended recipient. Once delivered to this office, the mail item must be again sorted and handled in order to be associated with a particular postal carrier assigned a route including the intended recipient.

However, it shall be appreciated that the present invention's electronic induction into the postal system at a point early in the paradigm and/or direct electronic delivery to the postal office nearest the recipient avoids the handling and transportation delays introduced in the above described posting of mail. According to the present invention, the document need only be sorted at the way location, i.e., the postal office, in order to be electronically inducted or be associated with the proper carrier to physically deliver the document. If proof of delivery is desired, such as through the use of a return receipt, or special delivery is required, such as registered delivery or expedited delivery, such can be noted at the time of receipt at the way location. Thereafter, the delivery of the document may be handled accordingly.

The transmission location may be equipped with an accounting register, such as the portable processor device disclosed in U.S. Pat. No. 5,510,992, issued to Kara, incorporated herein by reference, which dispenses monetary value indicia to be utilized in paying for the transmission and delivery of the document. For example, in one embodiment of the present invention the system transmitting the document includes a data packet, either within the transmitted document or accompanying its transmission, which provides a reliable indication of having tendered a proper amount for the document's transmission.

Preferably, this accounting register includes means for date and/or time stamping the transmission of the document such as through the use of a secure real time clock provided within the above described portable processor device. As this date stamp is provided by a trusted secure device, it may be utilized to provide an official time stamp accepted by the delivery agent such as the United States Post Office (USPS) or otherwise acceptable, such as in litigation. The provision of such a real time clock and its subsequent use to securely date and time stamp postage is disclosed in the co-pending, commonly assigned, U.S. patent application entitled "System and Method for Controlling the Dispensing of an Authenticating Indicia" previously incorporated herein by reference.

Additionally, the transmission location may also possess means by which cryptographic keys may be utilized to encrypt the transmission of the document for security purposes. For example, in one embodiment, the above mentioned portable processor device is adapted to include or generate cryptographic keys, such as is disclosed in the co-pending, commonly assigned, U.S. patent application entitled "Method and System for Electronic Document Certification" previously incorporated herein by reference. Here, the transmitted document is encrypted, such as for security purposes, utilizing a cryptographic key for which the way location or the intended recipient has, or may be provided, the corresponding key suitable for decryption of the document.

Preferably, the way location equipment is robust in that it provides communication capabilities suitable for accommodating a broad spectrum of transmission location configurations. For example, the way equipment may include communication gateways to public data communication networks such as the Internet. Additionally, the way equipment may provide communication through such commonly available communication networks such as public switched networks (PSN).

In addition to providing communication means for a variety of topologies, the way equipment may also provide communication and document reproduction protocols compatible with a variety of configurations of transmission equipment. For example, the way equipment may provide for the receipt and printing of a document originated from a FAX machine transmitted through standard telephone lines. Additionally, the way equipment may provide for the receipt and printing of a document originated from a personal computer, such as an X86 or 680X0 based computer, transmitted through standard phone lines or a data network such as the Internet. Likewise, the way equipment may provide for the electronic acceptance of documents originally transmitted as tangible hard copies where the way equipment includes a document scanner or other conversion device. It shall be appreciated that transmission of the document according to the present invention may utilize existing transmission protocols such as the aforementioned FAX transmission or even typical e-mail systems.

Preferably, the way equipment provides reproduction of the transmitted document in original quality. For example, text is produced in letter quality and graphic images are produced to include fine detail where such attributes exist in the original transmitted document. Of course, where a poor quality original is transmitted, such as through a standard FAX machine or a low quality electronic generation of a document, the way equipment's ability to produce an original quality reproduction may be limited. However, preferably the way equipment includes interpolation algorithms to smooth and otherwise improve the reproduction quality of documents received thereby.

In one embodiment, the way location is also be equipped to retain records with respect to receipt and subsequent delivery of the transmitted document. For example, the way equipment may utilize a database to store records with respect to a transmission of a document by a transmission location which is addressed for delivery to a particular receiving location. This database may be further supplemented by information from a particular carrier with respect to actual delivery of the document at the recipient location. Moreover, the way location may retain a copy of the transmitted document, such as for a predetermined period of time, in order to not only provide proof of a transmission and delivery of the document, but to prove the contents of the document itself.

Therefore, a technical advantage of the present invention is that the speed of electronic document transmission, even over great distances, is combined with the advantages of physical acceptance or delivery of documents. Some of the advantages of physical acceptance of documents realized by the present invention are the nearly universal availability of transmission means at transmitting sites as well as the long established procedures and infrastructure to accomplish posting of such items. Some advantages of physical delivery realized through the present invention include independent third party confirmation of delivery, creation of a reproducible history with respect to delivery of a document, specialized delivery methods, as well as obviating the need for electronic document reception and reproduction means at the recipient location.

A further technical advantage of the present invention is that instantaneous proof of transmission and/or delivery of a document is provided by a trusted third party. Such proof may be further supplemented by the trusted third party maintaining a copy of the transmitted document to also prove the contents of the document.

A still further technical advantage of the present invention is provision of original quality reproductions of transmitted documents without the need for the sending location to actually possess the necessary apparatus to produce the same independently. Where, for instance, the sending location electronically creates the transmitted document, such a system may be utilized to provide reproduction capabilities beyond those economically reasonable at an individual transmission location.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
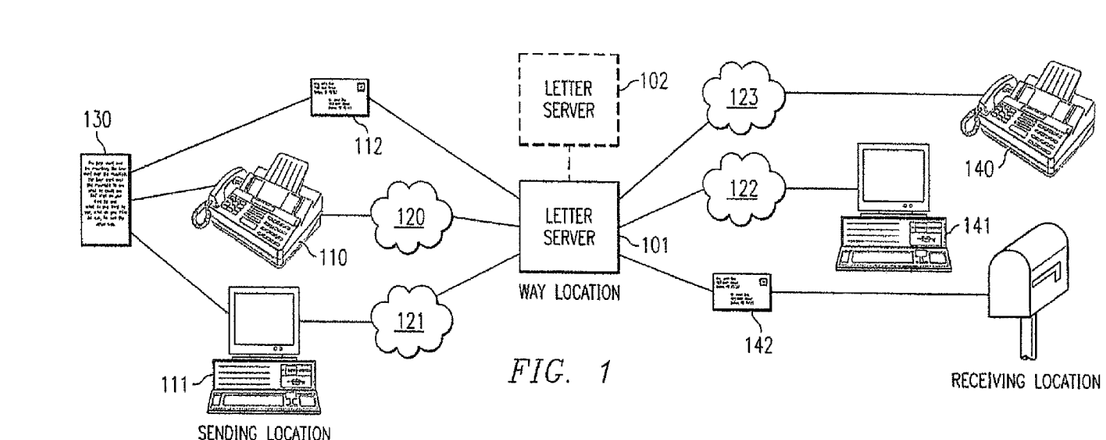
FIG. 1 illustrates the transmission of a document from a sending location through a way location to a receiving location according to a preferred embodiment of the present invention.

The present invention provides for the transmission and delivery of a document from a sending location to a particular recipient location. In a preferred embodiment, the transmission of a document is accomplished by transmitting the document from a sending site, through a trusted way location, to a recipient site as illustrated in FIG. 1.

In the preferred embodiment, a user invokes a system, such as FAX 110 or general purpose computer (PC) 111, at the transmission location to electronically transmit a selected document, such as document 130 through network 120 or 121, to a way location having receiving and reproduction facilities, such as letter server 101. Letter server 101 receives the electronic transmission of document 130 and provides reproduction of the document, such as illustrated by letter 142.

Alternatively, a user may transmit a selected document through physical means, such as posting letter 112. In this case, letter server 101 receives the transmission through a device which converts the physical document into an electronic representation. Such devices are well known in the art and are typically embodied in the form of a document scanner providing optical to digital conversion.

The receiving way location is preferably affiliated with a trusted letter or parcel delivery service (delivery service), such as the USPS, and therefore may provide physical delivery of the reproduction of the transmitted document to the physical address of the recipient. Such physical delivery may be part of the standard delivery service offered by the delivery service. For example, letter server 101 may provide originally transmitted document 130 in a format suitable for induction into the delivery service's standard delivery paradigm (although being introduced not at the typical induction point, but at a point in the paradigm very near the actual delivery of the document, taking advantage of sorting algorithms, such as by route, etc., and also providing for rate discounts such as by batching mail items by ZIP code, etc.). Alternatively, the delivery of originally transmitted document 130 may be accomplished through special handling by the delivery service as might be selected by the sender.

Of course, the way location may be associated with an entity or enterprise other than an official delivery service, if desired. For example, the way location may be affiliated with the sending location, such as is a mail room. Likewise, the way location may be provided by an intermediary service to the sender and delivery service which will actually deliver the document. However, in such a case, the document will typically be inducted into the delivery service's standard delivery paradigm at a point further removed from the actual delivery than when the way location is affiliated with the delivery service.

Reproduction of the document by the letter server may include preparing a suitable container for the actual document, such as selecting and addressing an envelope for standard mail transmission of letter 142, or may similarly include properly formatting the document for electronic transmission, such as providing routing or other information to forward as an electronic transmission to receiving FAX 140 and/or PC 141. Of course, reproduction of the document may take any form commensurate with the means by which letter 142 is to be ultimately delivered, including the preparation of any associated items such as the aforementioned container or even the inclusion of a stamp or other indication of payment or authorization for subsequent delivery.

Moreover, as reproduction of the document by the letter server may be electronic, such as for delivery via FAX, such as to FAX 140 connected by network 122, or e-mail, such as to PC 141 connected by network 123, the delivery container may not be a container in the common vernacular, but rather a protocol for proper delivery. For example, the document may require proper routing information or predefined packetization in order to be transmitted to a desired receiving device. Accordingly, the letter server prepares the document for such delivery.

Additionally, as different delivery methods are available to any document transmitted to the letter server, a determination must be made as to the particular delivery method to be utilized for any document. Preferably, the sender indicates a preference for delivery of the document, such as through inclusion of delivery address information. Where this information is a physical address it might be presumed that delivery is to be physical, by way of postal delivery. Likewise, where the address information indicates an electronic address, such as a telephone number or e-mail address, delivery might be presumed to be commensurate with such addressing schemes. Alternatively, or additionally, the sender may indicate a preferred method of delivery, which information is stored by the letter server, used, for example, when no other method of delivery is otherwise indicated.

Of course, a recipient of such documents may indicate a preferred method of delivery. For example, recipients may provide the delivery service with information, as to how documents should be delivered, that is stored by the delivery service for subsequent reference when a document is to be transmitted. Such delivery preference information may include strata of delivery choices, such as identity of senders or types of documents for which a particular delivery method is to be used. Accordingly, a recipient may prevent the electronic delivery of unsolicited or unwanted documents through such systems as e-mail and relegate such documents to delivery by more conventional means. Moreover, a recipient might even designate certain types of documents and/or particular senders for which document delivery may be forgone, if desired.

Figure 3:
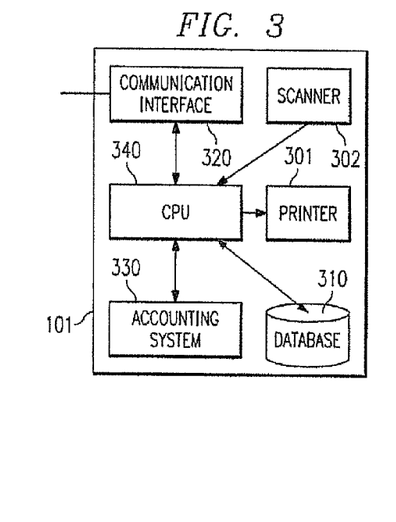
FIG. 3 illustrates a preferred embodiment of the letter server of FIG. 1.

In order to physically reproduce the document, letter server 101 preferably includes a printer, such as printer 301 illustrated in FIG. 3. Printer 301 may be a general purpose printer, such as a laser or other printer well known in the art, which is capable of producing original quality documents including text and/or graphics. Moreover, preferably printer 301 includes adaptive algorithms to provide improved output quality such as graphic smoothing or interpolative techniques in order to produce high quality reproductions of the transmitted document. Of course, printer 301 may in fact be a combination of multiple printing devices such as a document printer, a graphics printer, and/or an envelope printer, if desired.

As documents printed by printer 301 might contain sensitive information, printer 301 may include substantially automated systems by which a printed document may be sealed within a delivery container without providing opportunity for viewing by unauthorized third parties. Alternatively, printer 301 may utilize special form material providing for the outputting of hidden confidential information which may readily be rendered visible by the addressee. For example, the form used may comprise multiple laminated parts adapted to produce a document on a face of one of the parts which is visible only upon delamination of the parts. The document may be produced by printer 301 causing impact, heat, or other catalytic action in areas corresponding to particular areas of the document, in order to produce the desired document.

Preferably, printer 301 also includes the ability to print various sizes of documents to accommodate the more common document sizes in use today. Additionally, printer 301 may provide the capability to print information or images ancillary to the document being transmitted. For example printer 301 may print a letter head, signature, or other information typically associated with an original document.

Furthermore, printer 301 also preferably includes the ability to properly address or otherwise prepare delivery containers to be associated with a transmitted document. For example, printer 301 may include envelope or label handling capabilities in order to print recipient address information thereon. Of course, delivery containers adapted to allow selected areas of the document to be seen therethrough may be utilized in combination with or in the alternative to the ability to address delivery containers.

To provide for acceptance of documents transmitted in tangible form, letter server 101 may include a device for converting such tangible documents into electronic form, such as scanner 302. Scanner 302 may be a general purpose image scanner, such as a flat bed optical scanner or other page scanner well known in the art, which is capable of producing high quality electronic representations of documents including text and/or graphics. Moreover, preferably scanner 302 includes optical character recognition algorithms to provide information, such as addresses, in machine readable form. Of course, rather than scanner 302, a system operator transcribing the transmitted document into its electronic form may be used, if desired.

In addition to printer 301 and scanner 302, letter server 101 may include additional components such as database 310, communication interface 320, accounting system 330, and central processing unit (CPU) 340 illustrated in FIG. 3. Communication interface 320 provides data communication between a document transmission system such as FAX 110 or PC 111 of FIG. 1 and various components of letter server 101. Likewise, communication interface 320 provides data communication between letter server 101 and document receiving systems, such as FAX 140 and PC 141. This interface may be any number of interfaces known in the art suitable for providing data communication, such as a modem for communication over a PSN or the Internet, or a network interface card (NIC) for communication over a computer network.

Accounting system 330 may include an algorithm for debiting costs associated with the transmission/delivery of a document from accounts associated with either the sender or receiver of the document. Such algorithms may include storage of a credit associated with the sender or receiver and the subsequent deduction of value therefrom. Likewise, the algorithms may include instructions suitable for demanding payment from a third party such as a bank card issuer or the like. Moreover, accounting system 330 may include an algorithm for determining that a document transmission has been prefunded, such as through deduction of a credit stored in a device coupled to a document sending location, as is discussed in detail below.

Database 310 may include information with respect to accounts or other information with respect to sending locations. Additionally, database 310 may store information such as a letterhead or company logo useful in reproducing a formal document where, for example, the transmission means does not provide for such, e.g., a typical e-mail client. The database may also store information such as a bitmap or graphics image of a handwritten signature of a sender for reproduction on a transmitted document.

Moreover, as authentication information may be included in or with the transmitted document, database 310 may be utilized to securely associate any number of useful pieces of information with a transmitted document. For example, the aforementioned debit or credit may be secured from unauthorized transactions, or the aforementioned signatures may be incorporated in a transmitted document, through reference to authorization information, such as through the use of trusted sender identification information. It shall be appreciated that a system at the sender's location may be adapted to provide such trusted information, such as through the use of the portable processor device taught in co-pending, commonly assigned, parent application entitled "System and Method for Controlling the Storage of Data within a Portable Memory," which has been previously incorporate by reference herein. Likewise, some e-mail systems today utilize a client system which provides unalterable identification of the sender, such as a digital certificate or digital signature, useful according to the present invention.

Database 310 may include information regarding recipients or recipient locations, such as address information, discussed in detail below, or preferred delivery methods. Additionally, database 310 may include a bitmap or graphics image of a handwritten signature or digital signature associated with a recipient such as for inclusion in a receipt of delivery. Likewise, database 310 may include debit or credit account information associated with a recipient in order, for example, to charge the recipient for delivery of a transmitted document or declining to receive a transmitted document.

CPU 340 provides the control for various components of letter server 101. CPU 340 may be a special purpose device adapted to control the various aspects of letter server 101. However, preferably CPU 340 is embodied in a general purpose processor-based system operating under control of a set of instructions to provide the various features of the present invention. Furthermore, it shall be appreciated that the above described components of letter server may be embodied in and/or coupled to such a general purpose processor-based system.

It shall be appreciated that the components of letter server 101 may be disposed at physically diverse locations. For example database 310 and/or accounting system 330 may be located at a central location in order to serve a plurality of letter servers.

Likewise, printer 301 may be located apart from the other components of letter server 101, such as within optional letter server 102 illustrated in FIG. 1 coupled to letter server 101 through network 124. For example, letter server 102, including printer 301, may be located at a post office substation determined to be nearest to the actual recipient location while other components of letter server 101 are located at a centralized post office or one disposed nearest the sender. Of course, letter server 101 and 102 may each include similar components, thus allowing for the acceptance of a document at one letter server and subsequent re-transmission at another. Moreover, the number of letter servers is not limited to the two shown and may, in fact, include a substantial network, such as one disposed at every station of the delivery service. It shall be appreciated that communication between the letter servers of the present invention may be according to a unique protocol. Accordingly, where a document received at letter server 101 is to be retransmitted by letter server 102, the document may be communicated there between in a format different than received at letter server 101 and/or retransmitted at letter server 102. Preferably this intermediate format is adapted for efficient utilization of bandwidth between the letter servers of the present invention. Upon receipt of the transmitted document in the intermediate format by letter server 102, the document is converted for proper retransmission to the recipient.

Alternatively, printer 301 may be located on premises of the recipient party, thus eliminating the need for subsequent delivery by the delivery service. Such an embodiment may be especially desirable where the recipient receives a large number of documents such as, for example, the Internal Revenue Service (IRS) or other government agency.

It shall be appreciated that the reproduction of the transmitted document on the premises of the recipient party according to the present invention provides advantages over the FAX transmission of documents point to point common today. According to the present invention, a trusted third party is involved in the document's transmission and, therefore, provides reliable proof or confirmation of the document's transmission. Moreover, time stamping of the document, such as may be provided by a secure accounting unit, the letter server, or the delivery service itself, may be utilized by the sender to prove posting by a particular date and/or time such as is often required by government agencies such as the IRS. Time stamping at the point of transmission may be very useful, and indeed be paramount in defeating a deadline, where transmission latencies exist or crossing of date and/or time lines is necessitated.

Moreover, the present invention provides additional advantages by providing a convenient and trusted means by which postage fees for the transmission of documents may be paid/collected. In addition, or in the alternative, to payment provided by the letter server utilizing debit or credit accounts associated with either the sender or recipient, payment may be in the form of prepayment deducted from a secure register at either the transmission or reception site.

Additionally, advantages of the present invention may be realized by locating all of the components of the letter server on the premises of the recipient party where such components are secure from tampering or unauthorized access. For example, the aspects of the present invention providing the trusted confirmation of the document's transmission may be located within the confines of a secure processing device, such as the portable memory device taught in co-pending, commonly assigned, patent application entitled "System and Method for Controlling the Storage of Data Within a Portable Memory," which has been previously incorporated by reference herein.

In sending the document through the present invention, the sender may provide certain information in addition to the actual content of the document in order to complete delivery of the document. For example, in order to deliver the reproduced document, the delivery service must be apprised of the address (physical, electronic, or otherwise) of the recipient. The sender may provide this information in the form of header or cover (supplementary) information accompanying the electronic document transmission. Where FAX 110 is utilized to transmit the document, for example, the sender may include a "FAX cover sheet" having the physical address of the recipient included thereon. Likewise, where PC 111 is utilized, the sender may provide recipient location information to be included within a data packet accompanying the electronic transmission of document 130.

Of course, the inclusion of such recipient information may be standardized, such as through the use of predefined forms or protocols, in order that letter server 101 may automatically distinguish this information from the document itself. For example, a standardized form may be utilized as the above referenced FAX cover sheet whereby letter server 101 is able to electronically determine the necessary recipient information from the transmission and thereby properly prepare any necessary delivery accouterments. Here, for example, letter server 101 may blindly reproduce a particular predefined area of the FAX cover sheet upon an envelope to be later utilized to deliver the transmitted document.

Similarly, PC 111 may accept recipient information and format it to properly accompany document 130 whereby letter sever 101 may isolate this information for provision of the delivery information in the proper form for delivery of letter 142. For example, where PC 111 utilizes an e-mail system in order to transmit the document, predefined areas of the e-mail may be utilized for such information. As e-mail systems typically include predefined fields such as "to," "from," and "re:" lines, these fields may be utilized to provide recipient information. Likewise, a first page of an e-mail transmission may be defined as a "cover sheet" as described above with respect to FAX transmission. Here letter server 101 would simply look to a particular area of the e-mail transmission in order to determine any information regarding the handling of the document.

Of course, use of PC 111 to transmit documents according to the present invention may include the use of a program specifically adapted for use with the present invention. Such a program may provide a user interface which solicits necessary or useful information from a sender, in addition to the actual contents of the transmitted document, in order to complete the transmission according to the present invention. This program may be operable on PC 111 or may be operating at least partially remotely. For example, a "web server" or other communication server which allows remote client systems such as PC 111, running the appropriate browser or client, to interact with the server, in order to compose and/or transmit a document, may be used. This interaction may include the execution of applets at PC 111 or may simply receive keystroke information at the server from the remote client.

Often document 130 may itself include recipient information. For example, in the case where document 130 is a typical letter, information sufficient to physically locate the recipient is generally included within the document as an address block. Therefore, letter server 101 may also be adapted to browse the contents of document 130 in order to determine recipient information without requiring the sender to separately provide this information. Preferably, such an adaptation is provided in letter server 101 as a secondary function, to be utilized in the case where the aforementioned provision of such information is not provided as supplementary information. In this way, senders may include recipient information for documents not including such information therein, while not being required to duplicate such information where it readily appears within the transmitted document.

Electronic transmission of documents via FAX is well known in the art and, therefore, will not be discussed in detail herein. However, it shall be appreciated that a document transmitted via FAX is communicated as an image of the document (i.e., picture telegraphy) rather than a transmission of the components of the document (i.e., the characters forming the words of the document).

Therefore, in a preferred embodiment, where letter server 101 is adapted to browse the transmitted document to isolate the recipient information, letter server 101 includes circuitry to provide for the conversion of the image information of a FAX transmission to character information suitable for electronic processing. For example, letter server 101 may include character recognition algorithms common today in optical character recognition (OCR) to provide conversion of portions of a graphical image, such as the FAX transmission of a document, into character codes, such as those of the American Standard Code for Information Interchange (ASCII), which may be browsed to intelligently determine the recipient's address.

Moreover, it shall be appreciated that conversion of the FAX image to character codes may be utilized by the present invention for advantages in addition to the intelligent determination of the recipient's address. Where the present invention acquires the recipient information as character information, such as through the aforementioned conversion of FAX information to character code or when received as data from a transmitting PC, letter server 101 may include or be coupled to a database, such as database 310 for example, providing information regarding recipient addresses. Here the database may be utilized to confirm the accuracy of the address or to provide change of address information. Similarly, such a database may be utilized to supplement addressing information with carrier route information, such as ZIP plus four carrier route information. Likewise, the database may be utilized to determine a delivery method through cross-reference to information regarding delivery. Additionally, letter server 101 may use the recipient information to automatically sort the documents in order to provide more efficient delivery and/or reduced delivery charges.

Of course, rather than providing recipient address information on a transmission by transmission basis, address information may be stored, such as in data base 310, for correlation with particular documents. For example, a recipient's name, or other unique identification information, may be utilized by a letter server to determine an address through reference to a relational database of such information.

In addition to the intelligent use of recipient information, letter server 101 may similarly utilize other information accompanying the transmitted electronic document. Other, or ancillary, information may be included with or in the electronic document transmission such as date and time of transmission of the electronic document, special delivery instructions, authentication information, a method of payment for the transmission/delivery of the document, or instructions for the letter server system to archive a copy of the transmitted document, if desired. Furthermore, the inclusion of more than one recipient's address may be utilized to provide for multiple document deliveries from a single transmission of a document, if desired.

For example, ancillary information accompanying the electronic document transmission may indicate the sender's desire to have the document specially handled by the delivery service. Such special handling may include such services as expedited delivery, registered delivery, the return of a delivery receipt, or any other service available by the delivery service.

Likewise, ancillary information may be utilized to indicate a method of payment for the transmission/delivery of the document. For example the ancillary information may include a charge or debit account from which the funds necessary to finance the transmission/delivery of the document may be acquired. Such information may be utilized by accounting system 330 in properly charging for the service provided.

It shall be appreciated that such ancillary information may be an integral part of the transmission rather than information specifically included therein. For example, information identifying a sender of an e-mail or FAX is typically included in the transmitted document automatically. Moreover, such information may be provided in a trusted way, such as by way of a user unalterable e-mail address or account associated with the transmitted document. This trusted information may be utilized for authentication purposes such as for debiting an account associated with the sender, etc.

Of course, it shall be understood that an embodiment of the invention may be practiced without any method of payment for the service being provided, if desired. However, it shall be appreciated that payment for transmission of a document by a sender inherently provides a certain amount of deterrence against frivolous document transmissions. Specifically, a sender of documents via such a system is going to be dissuaded from sending a volley of communications for such purposes as harassing a recipient. Accordingly, recipients utilizing the services of the letter server are relieved of many of the problems associated with the nearly cost free ability of senders to instantaneously and repeatedly transmit communications to a recipient.

Figure 2A:
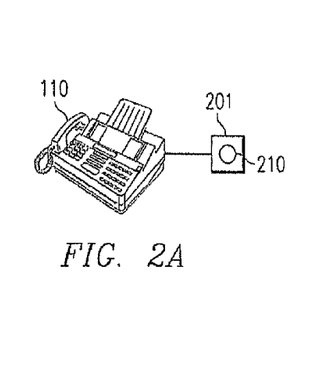
FIGS. 2A and 2B illustrate the connection of a credit storage device to the document transmission systems of FIG. 1.
Figure 2B:
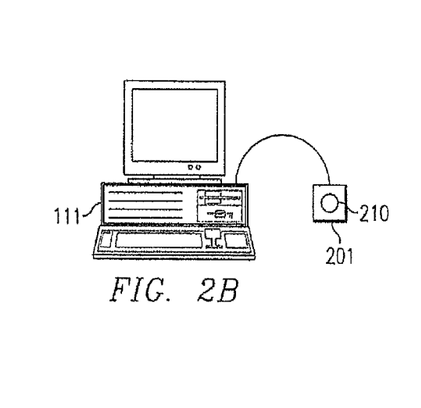

In a preferred embodiment, payment for transmission/delivery of documents according to the present invention is accomplished by the transmitting and/or receiving system, such as PC 111, FAX 110, PC 141, or FAX 140, deducting a value associated with the service from a credit stored in a portable memory coupled thereto, such as portable processor 210 coupled to interface 201 illustrated in FIGS. 2A and 2B. A portable memory and method for deducting a value from a credit stored within is taught in co-pending, commonly assigned, patent application entitled "System and Method for Controlling the Storage of Data Within a Portable Memory," which has been previously incorporated by reference herein. Of course, the credit may be stored at the sending site other than in a portable memory, if desired.

Deduction of a proper value by the sender of a document may subsequently be verified. Such verification may utilize information, such as a data packet or indicia created upon deduction of the credit, transmitted with or within the transmitted document in order to reliably determine that the value of the services has been paid. For example, the letter server may independently verify the data packet referencing data contained therein. Likewise, the letter server may use accounting system 330 described above to confirm that the data packet or other indication of payment was generated by an authorized sender or that a balance of postage credit previously issued has not been exceeded.

Therefore, in an alternative embodiment, FAX 110 is adapted with additional circuitry in order to deduct a value from a credit stored within a coupled processor device. In addition to interface 201 and processor device 210 illustrated in FIG. 2A, FAX 110 is adapted to include algorithms suitable for interacting with processor device 210 to deduct a value commensurate with the transmission/delivery of the document. Such algorithms may recognize transmission to the way location, such as through identifying a particular phone number or other electronic address, in order to determine the propriety of deducting credit from the portable processor device. Alternatively, the algorithms may monitor communication between FAX 110 and any device coupled via network 120 to determine the propriety of deducting credit. For example, the algorithm may detect a predetermined signal from a coupled device to determine when and/or how much value to deduct from the credit stored within the processor device. Thereafter, the document transmitted by FAX 110 may be supplemented to include, or otherwise be associated with, the aforementioned data packet which includes proof of payment and possibly other information, such as a time stamp.

FAX 110 may be physically modified or adapted in order to provide interface 201. However, it shall be appreciated that interface 201 may also be provided without the need to physically modify typical FAX machines in common use today. Such an interface may be provided through coupling circuitry to a standard interface port already provided in FAX 110, such as a serial communication port provided by the original equipment manufacturer. Likewise, interface 201 may be coupled to FAX 110 via its interface with network 120. Such an embodiment could provide for deduction of credit by monitoring communication over network 110, such as the aforementioned electronic address or response signal, without the need for any modification of FAX 110.

PC 111 may be similarly adapted to provide deduction of credit. For example, where a general purpose communication system, such as an existing e-mail system, is utilized to transmit a document according to the present invention, a terminate and stay resident (TSR) program may operate on PC 111 to identify the transmission, deduct the proper value from a storage device, and transmit an indication of proper funding along with the e-mail. Of course, where the aforementioned specifically adapted program is utilized, this program may include the necessary algorithm to deduct the proper amount from the storage device.

Of course letter 112 may include the well known postage stamp as proof of payment for postal services. The inclusion of this stamp may be verified upon receipt in the delivery system as is well known in the art. Additionally, or alternatively, letter 112 may include a data packet or indicia, either upon the exterior of the delivery container or within the transmitted document itself, which provides proof of payment for the postal/delivery services utilizing the letter server. This data packet may be advantageously used to provide the aforementioned date stamping provided by the trusted accounting device. Systems and methods for providing such a data packet having proof of payment, as well as other information such as a date stamp, are taught in the co-pending applications entitled "System and Method for Controlling the Dispensing of an Authenticating Indicia" and "System and Method for Printing Postage Indicia Directly on Documents" previously incorporated by reference. Of course, the aforementioned sender authentication information may be utilized for indicating proof of payment or for authorizing the deduction of payment from the sender's account rather than including a separate proof of payment, if desired. Accordingly, the provision of this accounting information may be provided in a trusted and fully automated fashion, requiring no additional interaction with the user. For example, where the secure portable processor taught in the patent application entitled "System and Method for Controlling the Dispensing of an Authenticating Indicia" is used, the sender identification information may be generated by the secure portable processor only upon deduction of a charge for the transmission from a value register contained therein. Accordingly, the sender may be identified and payment confirmed from a single piece of transmitted information.

Preferably, upon successful transmission of the document from the transmission location to the way location, confirmation of transmission is returned to the transmission location. Such confirmation may be in the form of a message confirming the size and date/time of the transmission and may include information regarding the sender and/or receiver. Alternatively, such confirmation includes information from which the transmitted document may be recreated. For example, the confirmation may be a code, such as a two dimensional bar code, containing not only the above information, but also information from which the complete document may be later reproduced. Such information provides advantages to the present day return receipt commonly used in postal systems, as not only may the transmission of a document be confirmed, but so to may the contents of that document.

The confirmation of transmission by the present invention may be immediately returned electronically to the transmission site, such as through return FAX or a reverse channel signal communicated to a transmitting PC. Alternatively, the confirmation may be provided separately such as through a hard copy transmitted through a postal system.

Of course, where a return receipt, or other confirmation of actual delivery of the document to the receiving location, is requested this confirmation may be returned to the sending party electronically as described above for the confirmation of transmission. This method of providing confirmation of delivery may be used to not only provide the advantages discussed above, but also may significantly decrease latency between the delivery of the document and the receipt of the confirmation by the sender.

Figure 4:
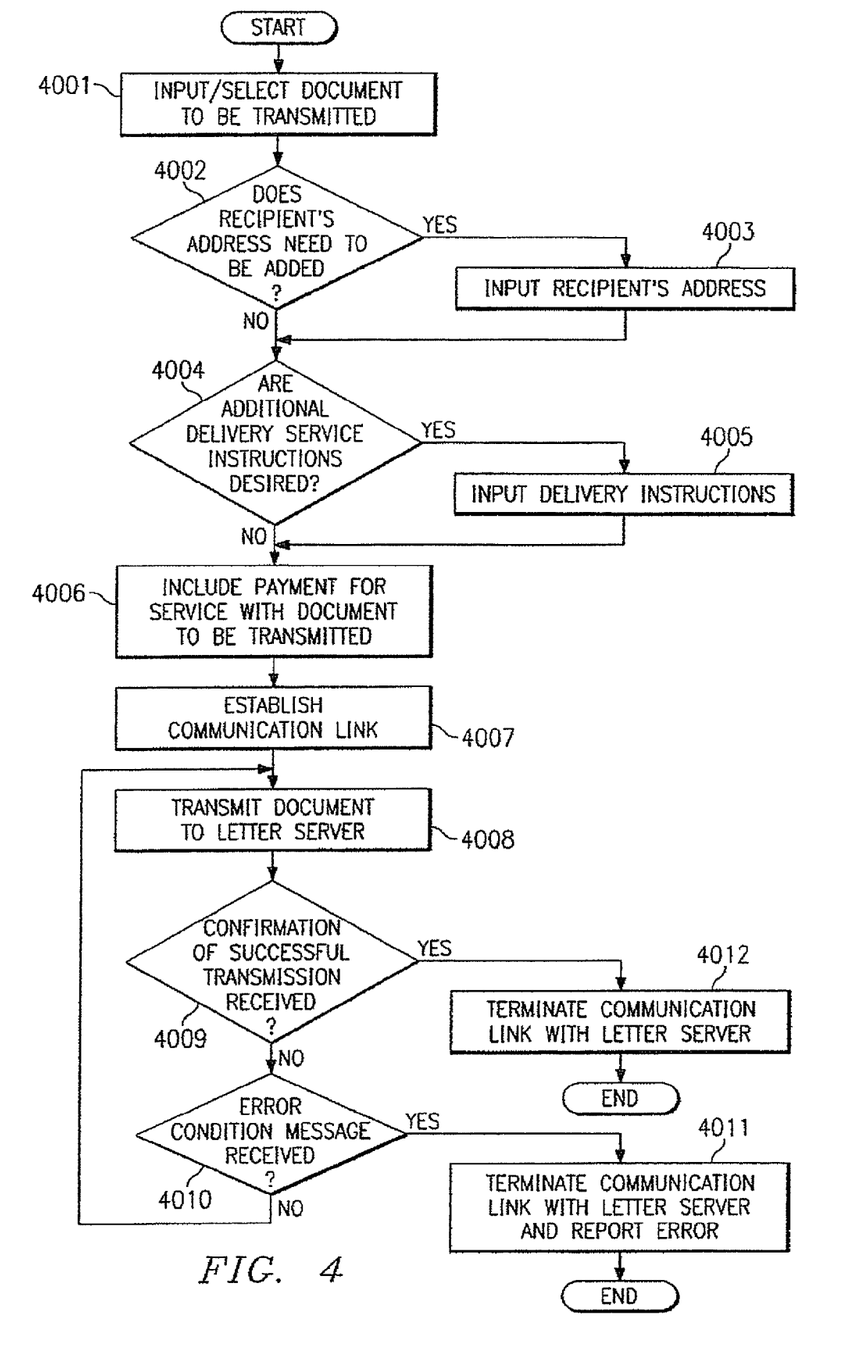
FIG. 4 illustrates a flow diagram of the transmission of a document from a sending location according to a preferred embodiment of the present invention.

Directing attention to FIG. 4, a flow diagram of a preferred embodiment of the transmission of a document from a sending location according to the present invention is depicted. Initially, the user selects or inputs a document to be transmitted (step 4001). Input of a document may be, for example, accomplished through scanning a document into a FAX or inputting a message into an e-mail system. Of course, input of a document may be accomplished through posting a tangible representation of the document.

Selection of a document may include selecting a document stored within the sending system which may have been input or generated by another program, such as a word processor, spread sheet, accounting system, or graphics application. It shall be appreciated by one of skill in the art that an application operable to transmit a document according to the present invention may be executed in the form of a TSR program, or similar co-existing program, and therefore allow for the automatic association of a document created within a co-executing process. In a preferred embodiment, where a computer is utilized to transmit the document, the application operable to transmit the document provides the ability to select and transmit an electronic document created in a co-executing process.

At step 4002 it is determined whether the document recipient's address needs to be added to the transmitted document. As described above, many documents may include recipient address information and therefore not require duplicitous input. However, if it is determined that such information should be included in the transmission, at step 4003 the information is input in a predetermined format or portion of the transmitted document as described above.

If the recipient's address information does not need to be input, or after such is input, a determination is made as to whether additional delivery service instructions are desired (step 4004). Such instructions may include expedited delivery, return receipt instructions, or the like as discussed above. These instructions are input in a predetermined format or portion of the transmitted document as described above (step 4005).

If no additional delivery service instructions are desired, or after such are input, payment information or authentication information useful in determining payment for the transmission/delivery of the document is included (step 4006). As described above, the payment method may be an indication of pre-payment, such as a deduction of credit from a coupled memory device, including the aforementioned data packet or indicia. Likewise, the payment method may be instructions to debit a credit or charge account or the like. Alternatively, authentication information, providing trusted identification of the sender may be utilized to determined account for payment, as discussed above. Of course, where no payment for the service is desired, this step may be omitted.

At step 4007 a link between the sending location and the letter server is established. The particular letter server to which the link is established may be determined through reference to a database indicating a proper letter server through reference to a ZIP code, for example, in the recipient's address. Likewise, the link may be established indirectly through a central office which determines a proper letter server to handle the particular document being transmitted. Of course, where a tangible copy of the document is transmitted such as through posting the document, the link is physical delivery of the document. In such a case the particular letter server to which the link is established may be determined by that closest to the sender or the most expedient to receive the document for re-transmission to the recipient.

Additionally, it shall be appreciated that the link between a sender and the letter server (as well as between the letter server and a recipient) may be a virtual communication link. For example, in the case of e-mail transmission, a sender may establish a link with an Internet Service Provider (ISP) and upload (transmit) a document. Thereafter, the ISP may store and forward the document to the letter server. Forwarding of the document to the letter server may be direct or indirect, utilizing any number of hubs, routers, and gateways to store and/or forward the document to an appropriate letter server.

The link established in step 4007 is a link suitable for data communications between the sending location and the letter server, such as a PSN, a computer network, the Internet, or the like. In the preferred embodiment, linking step 4007 includes the substeps of dialing a data communications access phone number, providing information as to which resource available through the data communications access is to be utilized, and verifying that data communications with a letter server or other suitable intermediary equipment has been accomplished.

It shall be understood that there is no limitation of the present invention to establish and terminate the communications link between the sending location and the letter server. For example, where digital telecommunications trunks or a digital network system are utilized for providing communication links, a data communication link may advantageously be maintained for extended periods of time thereby eliminating the need for the sending location to establish and terminate the communication link.

Upon establishing a link between the sending location and the letter server, the document and associated information, such as recipient's address, delivery instructions, and payment method, are transmitted to the letter server via the established communication link (step 4008). If desired, the associated information, and/or the transmitted document, may be encrypted using cryptographic keys common to the sending location and the letter server to provide added security to the transmission. Such encryption may be advantageous in the case where the additional information includes sensitive information such as a method of payment. Similarly, the transmitted document may be encrypted using cryptographic keys common to the sending and receiving location to provide security to contents of the transmitted document.

After transmission of the document the sending location monitors data communications for the presence of confirmation of successful transmission (step 4009) or a message of error condition (step 4010). If a message indicating an error condition, such as failure of transmission or an unaccepted payment method, is received, then the communication link is terminated and the error condition reported (step 4011). Of course, rather than terminating the communication link, the sending location may instead instruct the operator to correct the error condition and re-attempt the transmission, if desired.

In the case where neither a confirmation of successful transmission nor an error condition is received, the sending location returns to step 4008 to retransmit the document. However, where the confirmation of successful transmission is received, termination of the communication link is accomplished at step 4012. Of course, where a virtual link is utilized, such as in the case of an ISP storing and forwarding the document, step 4009 may monitor the virtual link, such as by periodic connection to the ISP, for confirmation of the transmission. Receipt of an error condition message at step 4010 would result in return to step 4008 for retransmission of the document to the ISP. Confirmation of successful transmission at step 4009 would result in termination of the virtual link, i.e., recognize completion of transmission of the document, at step 4012.

It shall be understood that, although the foregoing discussion disclosed the transmission of a single document, multiple documents may be transmitted in any session. If desired, multiple documents may be transmitted by returning to an earlier step, such as step 4008, to continue the process again rather than terminating the communication link as in step 4012.

In the case of multiple recipient addresses being included in or with the transmitted document, the sending location may receive multiple confirmations of successful transmission indicating each of the recipients for which the document is to be delivered. The confirmation is the sending location's confirmation that the transmitted document was successfully transmitted to the letter server for delivery to the indicated recipient, and may include the exact date and time of receipt of the document. The indicia may be integrated into the original document by the sending location, or may be printed or stored, for example, on a disk drive, for later proof of transmission of the document.

Figure 5:
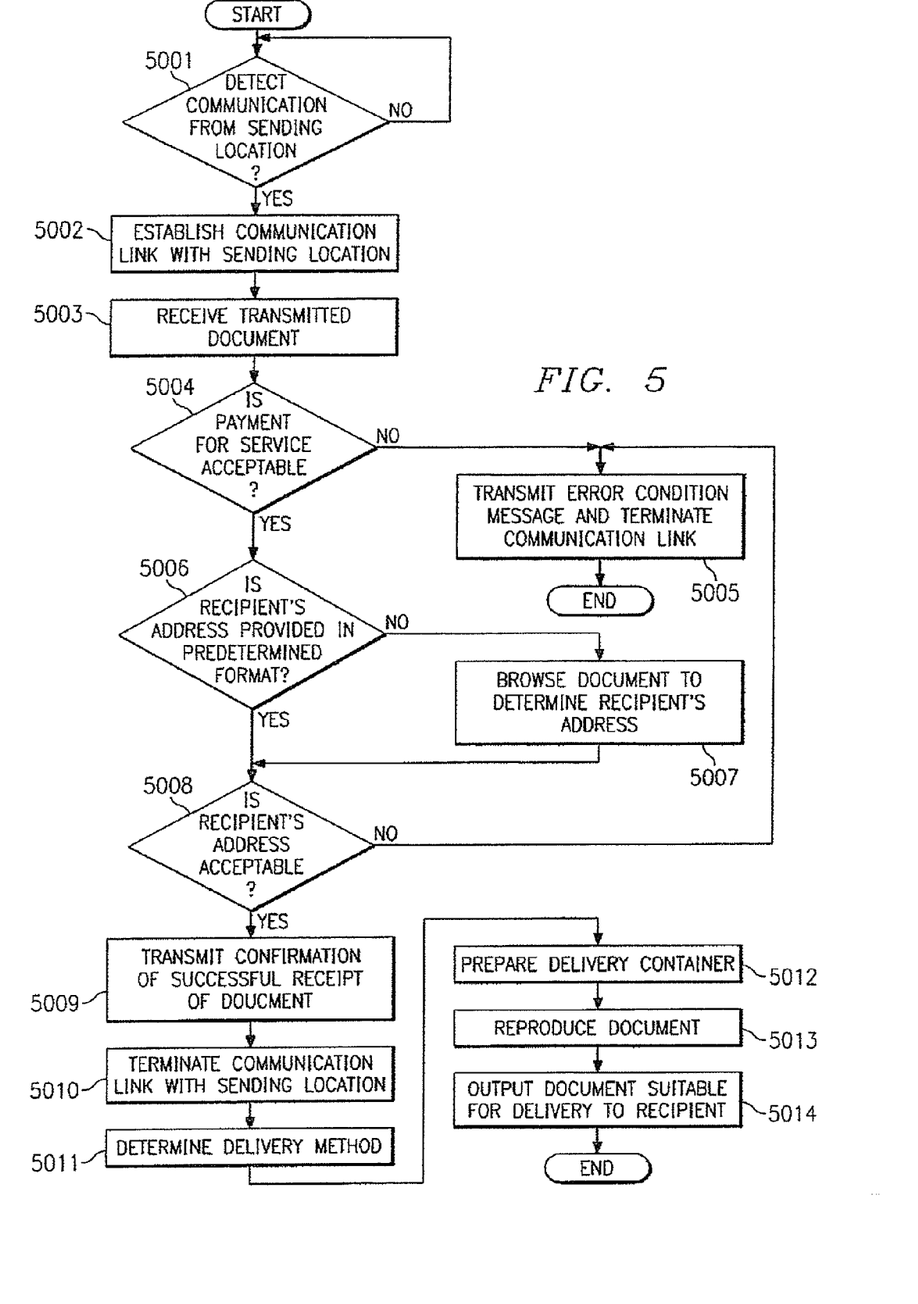
FIG. 5 illustrates a flow diagram of the receipt of a document at a way location according to a preferred embodiment of the present invention.

Having explained in detail the steps of sending a document according to a preferred embodiment of the present invention, attention is directed to FIG. 5 wherein a flow diagram of a preferred embodiment of receipt of the document by a letter server or other way location equipment is depicted. Initially, data communications are monitored for the presence of a sending location (step 5001). When the letter server detects the presence of a sending location, such as, for example, by a ring indication at communication interface 320, a link capable of data communication is established at step 5002. In an alternative embodiment, where digital telecommunications trunks or a digital network system are utilized for linking the sending location and the letter server, a data communication link may advantageously be maintained for extended periods of time. Of course, where the document is transmitted in tangible form, the letter server may be operated to establish a communication link, i.e., accept the tangible document, by an operator of the letter server.

At step 5003, the letter server receives a transmitted document and associated information from the sending location. If encryption of the associated information and/or the transmitted document is used, the additional substep of decrypting the associated information and/or document is necessary for meaningful use of their contents. Thereafter, at step 5004 it is determined if the payment information or authentication information included in the associated information is acceptable.

Payment methods may involve the sending location having a credit or debit account with the delivery service or may utilize point of sale funding methods such as a valid bank card account. Use of credit and debit accounts require the sending location to supply the delivery service with information suitable for setting up a database of such accounts prior to a document's transmission. In the case of a credit account, the user may be periodically billed for transmissions/deliveries previously sent. In the case of a debit account, the user prepays for transmissions/deliveries to be sent in the future. Upon making transmissions/deliveries, costs of the transaction are deducted from the user's debit account. In the case of a bank card account being utilized, the provider will demand authorization of payment from the bank card company concurrent with the document's transmission. However, credit could be maintained at the sending location, as discussed above, and be decremented in the value of delivery services upon a transmission and so indicated by a data packet or indicia included with the document's transmission. Furthermore, the system may provide for any of these methods with the sender selecting a payment method for each transmission or utilizing a preferred method in the absence of selection of any particular payment method.

If the determination of an acceptable authentication or payment is decided in the negative, a message of error condition is transmitted and the communication link is terminated at step 5005. Of course, as discussed above, rather than terminating the communication link, the sending location may be afforded the opportunity to correct the error condition, if desired.

In an alternative embodiment, where instructions for the way location to archive a copy of the transmitted document are included in the transmitted information, the letter server causes a copy of the document to be stored such as within database 310. Such storage may involve writing the document to a disk drive along with the confirmation information including the date of the document's transmission and recipient information.

After receipt of the document, the letter server determines if the recipient's address is provided in the associated information (step 5006). If the recipient information is not provided, then the letter server browses the document to determine the recipient's address (step 5007). The recipients address is then verified to determine if it is acceptable at step 5008. Verification may include reference to a database to determine if the address is correct or, similarly, may include conversion of the address as provided to an acceptable delivery address (i.e., conversion of a recipient's electronic address to a physical address or conversion of a previous address to a current address through reference to a database).

If the recipient's address is determined to be unacceptable, indicating inability to properly deliver the document, an error condition message is transmitted and the communication link is terminated at step 5005. It shall be appreciated that a confirmation of successful receipt of the document is not communicated to the sending location where the recipient's address is unacceptable as the delivery service is unable to deliver the document to the receiving location. Confirmation of transmission of such a document would be meaningless as there is no way to complete delivery of the document.

Upon determination of an acceptable recipient's address, the letter server transmits a confirmation of successful receipt of the document at step 5009 and thereafter terminates the communication link (step 5010). As discussed above, this confirmation may include such information as date of transmission, sender information, and recipient information. In addition to transmitting the confirmation to the sending location, the letter server may store a copy of the confirmation such as within database 310. Such a copy of the confirmation may be later used to authenticate a sender's confirmation purporting to show transmission of a document.

After accepting the transmitted document, a determination is made as to the appropriate delivery method for the document at step 5011. This determination may be made through reference to database 310. For example, information regarding the preferred delivery method of various recipients may be stored in database 310 and referenced via comparison to recipient information associated with the transmitted document. Similarly, preferences as to a delivery method may be provided accompanying the transmitted document or be stored in database 310 according to the sender. Likewise, the determination may be made as to the most expedient way to deliver the document.

Thereafter, a delivery container is prepared for the received document (step 5012). Of course, where a document is suitable for delivery without a container, or where a container is utilized which requires no preparation, the step of preparing a delivery container may be omitted.

At step 5013 the transmitted document is reproduced in a format suitable for delivery by the delivery service. Such reproduction may involved physical reproduction of the document such as may be accomplished by printer 301 or electronically as a data packet properly formatted for receipt by the appropriate receiving device. As described above, reproduction may include manipulation of the received document in order to present an original quality reproduction. Such manipulation may include interpolation algorithms to smooth graphic images, generation of an acceptable signature indicia, and the like. Additionally, reproduction may include appending certain information to the transmitted document, such as a letter head design.

Moreover, if the document is one upon which an authenticating signature is customarily appended, methods for producing an electronic authenticating signature, well known in the art, may be utilized by the present invention. Here an electronic signature transmitted with or accompanying the electronic document or stored in database 310, may be reproduced in a desired fashion, such as an image of a signature or perhaps a code such as a machine readable bar code or encrypted message, to confirm the status of the physical reproduction of the document as the "original" document.

Upon reproduction, the reproduced document is output to be delivered to the recipient location by the delivery service at step 5014. Such output may include not only output of the transmitted document, but may also include output of associated accoutrements such as the aforementioned delivery container, delivery instructions (including special delivery instructions, return receipt forms, etc.), indicia of authorization or payment for delivery, such as a postage meter stamp, and the like. The printing of the aforementioned indicia is taught in the co-pending, commonly assigned, patent applications entitled "System and Method for Controlling the Dispensing of an Authenticating Indicia" and "System and Method for Printing Postage Indicia Directly on Documents" previously incorporated herein by reference.

Output of the document by the letter server may include negotiating a communication link with the recipient, such as described above between the sender and letter server. Of course, this link may be virtual or may actually put the letter server in direct communication with equipment, such as FAX 140 or PC 141 at the recipient location. Moreover, the communication between the letter server and recipient may include exchange of information ancillary to the transmission of the document as is discussed with respect to the communication between the sender and letter server. As with the communication with the sender, this ancillary information may be utilized to authenticate a recipient for purposes of associating a signature with a delivery receipt or for determining/providing payment for delivery services.

If multiple recipients are included in the information received from the sending location, the letter server may return to step 5011 to produce additional copies of the document and its accoutrements. This provides for the delivery of the documents to each of the recipients indicated by the sender.

Although the document generated by letter server 101 has been discussed herein as a reproduction of the transmitted document, it shall be appreciated that this reproduced version of the document may be afforded the status of an original document. Because letter server 101 is administered by a trusted third party to the transmission, such as the United States Post Office or other letter or parcel delivery service, this reproduction is produced with confidence in the accuracy of the correlation to the transmitted document.

However, if additional confidence regarding the correlation between the electronic document transmitted and the physical document reproduced is desired, certification of the document may be accomplished electronically. A preferred method for electronically certifying documents is disclosed in the above referenced co-pending, commonly assigned, U.S. patent application entitled "Method and System for Electronic Document Certification" previously incorporated herein by reference.

According to this preferred method a trusted third party, here the delivery service, confirms the correlation between the transmitted document and the received document (here the reproduction of the document). When confirmed, an indicia of certification is generated which may be attached to the document. This indicia may include such information as the sending party, the time the document was transmitted and a summary indication of the document's contents for later detection of authenticity of the contents. Alternatively, this indicia may actually include a coded version of the contents of the document for later reproduction.

Of course, regardless of establishing the correlation between the transmitted document and received document, the present invention may operate to provide a receipt of actual delivery to the recipient of the transmitted document to the sender. This receipt may be communicated to the sender along the reverse path of the transmission of the document by the sender or may be by a different path. This receipt may include an acknowledgment of delivery by the recipient. In the case of electronic transmission, this acknowledgement may be in the form of a digital signature provided by, or associated with, the aforementioned authentication information.

Although the present invention and its advantages have been described in detail, it should be understood that various changes, substitutions and alterations can be made herein without departing from the spirit and scope of the invention as defined by the appended claims.

What is claimed is:

1. A system for delivering information to a receiving location from a sending location, said system comprising:
   an intermediate station other than said receiving location and said sending location, said intermediate station comprising:

a receiver adapted to receive electronic data from said sending location, said received data comprising: message data, payment data, and recipient data for a postal item;

a processor adapted to process said received data and provide information relating to at least some of said received data in human readable form; and a printer operable to print a message based, at least in part, on said message data; recipient information based, at least in part, on said recipient data and sufficient to determine the identity or address of a recipient; and payment information based, at least in part on said payment data and sufficient to signify that payment for delivery of said postal item has been paid or will be paid.

2. The system of claim 1 wherein said payment data comprises data indicative of a class of delivery for said postal item.

3. The system of claim 2 wherein said payment data comprises data related to said user.

4. The system of claim 3 wherein said payment data comprises data related to a method of payment for delivery of said postal item.

5. The system of claim 2 wherein said class of delivery is indicative of the speed at which said postal item will be delivered.

6. The system of claim 1 wherein said processor confirms receipt of said message data, payment data, and recipient data to said user before said postal item is delivered.

7. The system of claim 6 wherein said processor verifies a delivery address from said recipient information.

8. The system of claim 1 wherein said printer is remote from said receiver and said processor.

9. The system of claim 8 wherein said receiver is remote from said processor.

10. A method for delivering information to a receiving location from a sending location, said method comprising:

receiving, at an intermediate station remotely located from said sending location, electronic data from said sending location, said received data comprising: message data, payment data, and recipient data for a postal item;

processing, at said intermediate station, said received data and providing information relating to at least some of said received data in human readable form; and printing a message based, at least in part, on said message data; recipient information based, at least in part, on said recipient data and sufficient to determine the identity or address of a recipient; and payment information based, at least in part, on said payment data and sufficient to signify that payment for delivery of said postal item has been paid or will be paid.

11. The method of claim 10 wherein said payment data comprises data indicative of a class of delivery for said postal item.

12. The method of claim 11 wherein said payment data comprises data related to said user.

13. The method of claim 12 wherein said payment data comprises data related to a method of payment for delivery of said postal item.

14. The method of claim 11 wherein said class of delivery is indicative of the speed at which said postal item will be delivered.

15. The method of claim 10 further comprising confirming receipt of said message data, payment data, and recipient data to said user before said postal item is delivered.

16. The method of claim 15 further comprising verifying a delivery address from said recipient information.

17. The method of claim 10 wherein said printer is remote from said receiver and said processor.

18. The method of claim 17 wherein said receiver is remote from said processor.

19. A system for delivering information to a receiving location from a sending location, said system comprising:

a delivery service system, comprising:

a receiver adapted to receive electronic data representing postal item contents, said postal item contents transmitted from a sending location and being directed to at least one receiving location, and electronic data representing proof of payment information;

a processor adapted to analyze said proof of payment information to determine if payment has been made for delivery of said postal item to said at least one receiving location; and a printer operable to print said postal item contents as a postal item if said analyzing indicates payment has been made for said delivery of said postal item to said at least one receiving location, and in association with said postal item and using at least a portion of said proof of payment information, data indicating payment for delivery of said postal item to said receiving location has been paid or will be paid.

20. The system of claim 19 wherein said delivery service system is remote from said sending location and said receiving location.

21. The system of claim 19 wherein said printer is further adapted to print multiple copies of said postal item where multiple addressees are associated with said postal item contents.

22. The system of claim 19 wherein said printer is further adapted to prints text and an image when printing said postal item contents.

23. The system of claim 19 wherein said processor is further adapted to confirm successful delivery of said postal item to a sending user.

24. A method for delivering information to a receiving location from a sending location, said method comprising:

receiving, at a delivery service system, electronic data representing postal item contents, said postal item contents transmitted from a sending location and being directed to at least one receiving location;

receiving, at said delivery service system, electronic data representing proof of payment information;

analyzing said proof of payment information to determine if payment has been made for delivery of said postal item to said at least one receiving location;

printing said postal item contents as a postal item if said analyzing indicates payment has been made for said delivery of said postal item to said at least one receiving location; and printing, in association with said postal item and using at least a portion of said proof of payment information, data indicating payment for delivery of said postal item to said receiving location has been paid or will be paid.

25. The method of claim 24 wherein said delivery service system is remote from said sending location and said receiving location.

26. The method of claim 24 further comprising printing multiple copies of said postal item where multiple addressees are associated with said postal item contents.

27. The method of claim 24 wherein printing said postal item contents comprises printing text and an image.

28. The method of claim 24 further comprising providing confirmation of successful delivery of said postal item to a sending user.

\* \* \* \* \*

UNITED STATES PATENT AND TRADEMARK OFFICE
CERTIFICATE OF CORRECTION

| | | |
|---|---|---|
| PATENT NO. | : 8,064,088 B2 | |
| APPLICATION NO. | : 12/953295 | |
| DATED | : November 22, 2011 | |
| INVENTOR(S) | : Salim G. Kara et al. | |

It is certified that error appears in the above-identified patent and that said Letters Patent is hereby corrected as shown below:

On the Title page:

Item 63, Related U.S. Application Data (left hand column), delete the portion of text reading "No. 11/827,467, filed on Jul. 12, 2007" and replace with --No. 11/829,467, filed on Jul. 27, 2007--.

Signed and Sealed this
Twenty-seventh Day of December, 2011

David J. Kappos
*Director of the United States Patent and Trademark Office*